United States Patent Office 3,052,646
Patented Sept. 4, 1962

3,052,646
BLEND OF FINELY DIVIDED POLYAMIDE
AND POLYETHYLENE GLYCOL
Roger H. Doggett, Natick, Mass., assignor, by mesne assignments, to Polymer Processes, Inc., Reading, Pa., a corporation of Pennsylvania
No Drawing. Filed July 6, 1953, Ser. No. 366,375
5 Claims. (Cl. 260—33.2)

This invention relates to a method of molding granulated synthetic linear polyamides with or without a filler, and in particular to a method of molding such polyamides with the aid of mold lubricant. The synthetic polymeric materials used in the practice of this invention are the synthetic linear polyamides of the general type described in United States Patents 2,071,250, 2,071,253 and 2,130,948. In an application entitled Method of Preparing Finely Divided Nylon Powder, Serial No. 202,405, filed December 22, 1950, in the names of Louis L. Stott and Laurence R. B. Hervey, now U.S. Patent 2,639,278, a method of preparing finely divided synthetic linear polyamides was described. Another method was also described in an application entitled Method of Preparing Finely Divided Polyamides, Serial No. 273,566, filed February 26, 1952, in the names of Louis L. Stott and Laurence R. B. Hervey, now U.S. Patent 2,742,440. This latter application also defined the linear polyamides to which the process applies.

These polyamides as described above, or as otherwise identified hereafter, can be obtained, for example, by self-polymerization of monoaminomonocarboxylic acid, or by reacting a diamine with a dibasic carboxylic acid in substantially equimolecular amounts, it being understood that reference herein to amino acids, diamines and dibasic carboxylic acids is intended to include the equivalent amide-forming derivatives of these reactants.

These linear polyamides include also polymers obtained by admixture of other linear polymer-forming reactants, as for instance glycol-dibasic acid mixtures in the case of polyester amides, with the mentioned polyamide-forming reactants. The best results in the practice of the invention described herein, however, are obtained with unmodified straight polyamides. In the simple polyamides the average number of carbon atoms separating the amide group is at least two. On hydrolysis with hydrochloric acid, the amino acid polymers yield the amino acid hydrochloride, and the diamine-dibasic acid polymers yield the diamine hydrochloride and the dibasic carboxylic acid. For the sake of simplicity, the linear polyamides described above will be referred to herein as nylon.

In general, finely divided polyamides to which this invention applies are prepared by dissolving the polyamide in a solvent at elevated temperatures and precipitating the polyamide in the form of a powder by cooling or by the addition of a non-solvent. The solvent is one which dissolves the polyamide at elevated temperatures but is a non-solvent at lower temperatures. The resulting powder may be washed, if desired, to remove the solvent. The powder is dried and granulated to the proper size of aggregate which preferably is between 10–150 mesh. The steps of dissolving the precipitate and washing should be carried out under conditions which prevent oxidation of the nylon. The powder thus prepared is satisfactory in many respects as a molding powder. As disclosed in U.S. Patent 2,695,425, the powder may be formed into desired objects in a mold under a pressure of from 5–50 tons per square inch and sintered, if desired, to obtain increased strength. As further disclosed in that patent in to 85% of the total bulk volume may be filler.

The filler that may be added cover a wide variety of materials. In general it has been found that for most applications the fillers are advantageously finely divided, although bonding may be secured to larger pieces, if desired. If an abrasive is to be manufacture, abrasive particles are incorporated with the nylon; these include the usual abrasives such as diamond dust, ground silica, Carborundum, chalk, Alundum, tungsten carbide, etc. For other purposes metal powders, such as copper, lead, or iron, may be added to give the desired properties and these are readily incorporated with the nylon. For still other purposes carbon or graphite particles, or molybdenum disulphide particles, may be incorporated with nylon. In some cases ceramic materials with special dielectric properties are advantageously mixed with nylon. Among these are titanium dioxide and various titanates, in particular, combinations of titanium dioxide with alkaline earths. Still another useful filler is nylon of a higher melting point than that of the sintered material. On occasion polytetrafluoroethylene is a useful filler. The physical or electrical characteristics of molded nylon articles may therefore be tailored to meet the desired specifications where the incorporation of other materials is advantageous. The filler should be substantially non-reactive with the nylon, have a higher melting point than the temperature to which the nylon must be raised to sinter it and not subject to any substantial amount of decomposition during the heating step.

In most cases, the fillers serve to reduce hygroscopic or thermal expansion as compared to articles made entirely of nylon and aid materially in securing dimensional accuracy through reduced distortion during sintering. The reasons for these improved characteristics are not clear but have been repeatedly observed.

In pill-making, tableting, and in nearly all instances that powders are compressed in automatic processes, a small amount of lubricant must be mixed with the powder to prevent seizure of the compressed object in the die cavity. In addition, in the case of the nylon powders, there tends to be on compression a non-uniformity in the density of compressed objects. This difficulty becomes more acute as large pieces are formed and in extreme cases, particularly long objects with a relatively small cross section, actual cracks may form when the piece is subsequently sintered. Dry lubricants usually are satisfactory as they are powdered readily and may be intimately mixed with the powder to be tableted. Useful lubricants for such purposes are high-melting fats, such as hydrogenated cotton seed oil or metallic soaps such as calcium stearate. These usual lubricants, while satisfactory with the polyamide powders in allowing pieces to be formed in a press and removed, are unsatisfactory on sintering in an oil bath. The oil penetrates and discolors and weakens the heated article.

An object of this invention is to add to the polyamide powder a material having the characteristics of a mold lubricant but which does not adversely affect the physical properties of a compressed polyamide article sintered in oil.

This object may be accomplished by adding to the polyamide molding composition from 0.5%–3% by weight of a polyethylene glycol polymer having a molecular weight from 4000–8000.

In amount, the mold lubricant as stated above may be from 0.5%–3% by weight of the polyamide in the molding composition, while a preferred amount is from 1%– 2% by weight. Amounts in excess of 3% tend to produce finished objects of lower strength, while amounts with less than 0.5% are ineffective. The polyethylene glycol may be conveniently added to the dried granulated polyamide powder by first finely powdering the polyethylene glycol as by hammer-milling, followed by tumbling the powder with the granular polyamide until an intimate mixture has been attained. Other suitable means of dividing the polyethylene glycol and of mixing powdered polyethylene glycol with granulated polyamide may be employed. If desired, the polyethylene glycol may be admixed by dissolving it in a suitable solvent such as water, adding it to the polyamide molding composition (which may or may not contain solvents or moisture), and removing the solvent or moisture.

Care must be taken to reduce the size of the polyethylene glycol to a fineness which will form an intimate mixture with the polyamide powder. Such a fineness is greater than that which will pass through an 80-mesh screen.

The following examples will further illustrate the invention:

*Example I*

15 grams of polyhexamethylene adipamide were dissolved in 85 grams of ethylene glycol in a nitrogen atmosphere at 185° C. during a period of one hour. The solution was filtered, and cooled to 170° C. 200 cc. distilled water at room temperature were poured into the glycol solution with agitation. The nylon precipitated and the precipitate was washed with distilled water until glycol-free. The glycol-free powder was air dried, to remove most of the water, followed by vacuum drying to reduce the moisture content to less than one percent.

Vacuum dried powder was passed through a hammermill to reduce the aggregate size to the point where the powder would pass through an 80-mesh screen. A molded preform was made from this powder in ½-inch I.D. x ¾-inch O.D. mold at 25 tons per square inch. The molded preform was sintered in a mineral oil bath. The temperature of the bath was raised to 256° C. during a period of thirty minutes and maintained at this temperature for an additional thirty minutes. After sintering, the sleeve showed oil penetration at one end where, due to lack of uniformity of compression, the density of the material was low compared with the object as a whole.

*Example II*

Vacuum dried powder was prepared and hammermilled as described in Example I. Polyethylene glycol, molecular weight 6000, was passed through a hammermill and the particle size was reduced to the point where it passed through an 80-mesh screen. To 99 parts by weight of 80-mesh polyhexamethylene adipamide powder was added one part of 80-mesh polyethylene glycol. The powders were tumbled together. Six grams of the powder were molded into a preform and sintered as described in Example I. The uniformity of density of the sintered sleeve was much greater than that obtained by the procedure described in Example I. This was manifested particularly by the absence of oil penetration in localized areas.

*Example III*

The procedure described in Example I for preparing powdered polyhexamethylene adipamide was followed through the steps leading up to the final water wash. At this point, 0.15 gram of polyethylene glycol, molecular weight 6000, was added to 35 cc. of water and intimately mixed with the wet filter cake. This is equivalent to 1% of polyethylene glycol based on the nylon in the filter cake. The cake was then dried in air and vacuum dried as already described. The powder was passed through a hammermill and the aggregate size reduced so that the powder passed through an 80-mesh screen. A molded preform was compressed from this powder in a ½-inch I.D. x ¾-inch O.D. mold at 25 tons per square inch. The molded preform was sintered as described in Example I.

As in the case of Example II, the product exhibited no excessive penetration at any point in the sleeve. The uniformity of density, lack of oil penetration, and freedom from cracks were apparent.

Similar experiments were run employing from 0.5%–3% by weight of polyethylene glycol with the polymer of epsilon caprolactam and polyhexamethylene sebacamide. The oil penetration of oil-sintered sleeves was uniformly small and no excessive penetration at any point was observed.

I claim:

1. A dry intimate mixture consisting essentially of a finely divided fiber-forming synthetic linear polymeric carbonamide which contains recurring carbonamide groups as an integral part of the main polymer chain separated by at least two carbon atoms and solid polyethylene glycol, said polyethylene glycol being present in an amount equal to from 0.5%–3% by weight of said polymeric carbonamide, the molecular weight of said polyethylene glycol being between 4000 and 8000, the ultimate particle size of said polymeric carbonamide being less than 40 microns in diameter.

2. The product of claim 1 wherein the polymeric carbonamide is polyhexamethylene adipamide.

3. The product of claim 1 wherein the polymeric carbonamide is polyhexamethylene sebacamide.

4. The product of claim 1 wherein the polymeric carbonamide is the polymer of epsilon caprolactam.

5. A dry intimate mixture consisting essentially of a finely divided fiber-forming synthetic linear polymeric carbonamide which contains recurring carbonamide groups as an integral part of the main chain separated by at least two carbon atoms, a filler and solid polyethylene glycol, said polyethylene glycol having a molecular weight between 4000 and 8000 and being present in an amount equal to from 0.5%–3% by weight of said polymeric carbonamide, the filler being present in an amount up to 85% by volume of said mixture, said polymeric carbonamide having an ultimate particle size of less than 40 microns in diameter.

References Cited in the file of this patent

UNITED STATES PATENTS

| | | |
|---|---|---|
| 2,345,533 | Graves | Mar. 28, 1944 |
| 2,357,380 | Brant | Sept. 5, 1944 |
| 2,579,375 | Eisen | Dec. 18, 1951 |
| 2,615,002 | Hurwitz | Oct. 21, 1952 |

OTHER REFERENCES

"Carbowax," Carbide and Carbon Co., New York, New York, June 30, 1946, column 2, page 6.

"Du Pont," Technical Service Bulletin, No. 8B, dated March 15, 1950, page 5, E. I. du Pont de Nemours Co., Wilmington, Delaware.